US011834168B2

(12) United States Patent
Abdel Nour et al.

(10) Patent No.: US 11,834,168 B2
(45) Date of Patent: Dec. 5, 2023

(54) CONVERTIPLANE AND RELATED CONTROL METHOD

(71) Applicant: LEONARDO S.P.A., Rome (IT)

(72) Inventors: Pierre Abdel Nour, Samarate (IT); Carlo Cassinelli, Samarate (IT)

(73) Assignee: LEONARDO S.P.A., Rome (IT)

( * ) Notice: Subject to any disclaimer, the term of this patent is extended or adjusted under 35 U.S.C. 154(b) by 57 days.

(21) Appl. No.: 17/416,091

(22) PCT Filed: Oct. 31, 2019

(86) PCT No.: PCT/IB2019/059360
§ 371 (c)(1),
(2) Date: Jun. 18, 2021

(87) PCT Pub. No.: WO2020/136460
PCT Pub. Date: Jul. 2, 2020

(65) Prior Publication Data
US 2022/0073202 A1    Mar. 10, 2022

(30) Foreign Application Priority Data
Dec. 28, 2018   (EP) ..................................... 18248242

(51) Int. Cl.
*B64C 29/00*    (2006.01)
*B64C 9/04*     (2006.01)
(Continued)

(52) U.S. Cl.
CPC ............ *B64C 29/0033* (2013.01); *B64C 9/04* (2013.01); *B64C 9/18* (2013.01); *B64C 2009/005* (2013.01)

(58) Field of Classification Search
CPC ......... B64C 29/0033; B64C 5/10; B64C 5/08; B64C 3/50; B64C 9/04; B64C 9/18; B64C 2009/005; B64C 9/323
See application file for complete search history.

(56) References Cited

U.S. PATENT DOCUMENTS

| 1,856,157 | A | * | 5/1932 | Gassner | ..................... B64C 9/00 244/90 R |
| 5,096,140 | A | * | 3/1992 | Dornier, Jr. | ......... B64C 29/0033 244/12.4 |

(Continued)

FOREIGN PATENT DOCUMENTS

FR    2 791 634    10/2000

OTHER PUBLICATIONS

Bell Helicopter: "Demonstrating the Third Generation Tiltrotor Society of Experimental Test Pilots", Oct. 25, 2014 (Oct. 25, 2014). p. 11, XP055391132, Retrieved from the Internet: URL:http://www.zdana.net/2014/October/test102614/1330 V280/SETP - 3rd Gen Tiltrotor O91514.pptx [retrieved on Jul. 14, 2017] pp. 1, 7, 11 pp. 13, 14 pp. 17, 18.

*Primary Examiner* — Tien Q Dinh
*Assistant Examiner* — William L Gmoser
(74) *Attorney, Agent, or Firm* — Leason Ellis LLP

(57) ABSTRACT

Convertiplane comprising a fuselage; a pair of wings, a pair of nacelles fixed with respect to the wings, and a pair of rotors rotatable about respective second axes and tiltable about a third axis between a first position, reached when the convertiplane is in an aeroplane configuration, and a second position, reached when the convertiplane is in a helicopter configuration. The wing comprises a wing box and a first appendage movable when the convertiplane is in the aeroplane configuration, between a first neutral position, a second raised operating position, and a third lowered operating position; the wing comprises a second appendage movable between a first neutral position assumed when the convertiplane is in the aeroplane configuration and in which it defines an extension of the wing box, and a second position assumed when the convertiplane is in the helicopter configuration and in which it defines, with the wing box, an (Continued)

opening through which the downwash generated by the rotor can flow.

10 Claims, 8 Drawing Sheets

(51) Int. Cl.
*B64C 9/18* (2006.01)
*B64C 9/00* (2006.01)

(56) References Cited

U.S. PATENT DOCUMENTS

| | | | | |
|---|---|---|---|---|
| 5,570,859 | A * | 11/1996 | Quandt | F03D 7/0252 |
| | | | | 244/113 |
| 6,607,161 | B1 * | 8/2003 | Krysinski | B64C 29/0033 |
| | | | | 244/7 C |
| 11,453,475 | B1 * | 9/2022 | Dooley | B64C 3/10 |
| 2011/0135472 | A1 * | 6/2011 | Cazals | B64C 9/16 |
| | | | | 416/23 |
| 2016/0342160 | A1 * | 11/2016 | Shepshelovich | B64C 3/14 |
| 2017/0259908 | A1 * | 9/2017 | Omeara | B64C 9/04 |
| 2017/0305565 | A1 | 10/2017 | Kooiman et al. | |
| 2018/0305037 | A1 | 10/2018 | Kooiman et al. | |

\* cited by examiner

CONVERTIPLANE AND RELATED CONTROL METHOD

CROSS-REFERENCE TO RELATED APPLICATIONS

This patent application is a U.S. National Phase Application under 35 U.S.C. § 371 of International Patent Application No. PCT/IB2019/059360, filed on Oct. 31, 2019, which claims priority from European patent application no. 18248242.2, filed on Dec. 28, 2018 all of which are incorporated by reference, as if expressly set forth in their respective entireties herein

TECHNICAL FIELD

The present invention relates to a convertiplane and a related method of control.

BACKGROUND ART

In the aviation industry, aeroplanes are normally used for high cruising speeds, in particular above 150 knots and at high altitudes, for example above 30,000 feet. For high cruising speeds and altitudes, aeroplanes use fixed wings to generate the lift necessary for sustaining the aeroplane in the air. A sufficient amount of lift can only be achieved by accelerating the aeroplane on quite long runways. These runways are also needed to allow aeroplanes to land.

Contrariwise, helicopters generate the necessary lift through rotation of the main rotor's blades. Consequently, helicopters can take-off/land without the need for horizontal speed and using particularly small areas. Moreover, helicopters are capable of hovering and of flying at relatively low altitudes and speeds, thereby being particularly easy to handle and adapted for demanding manoeuvres, such as mountain or sea rescue operations.

Nevertheless, helicopters have intrinsic limits regarding the maximum operating altitude, which is around 20,000 feet and the maximum operating speed, which cannot exceed 150 knots.

In order to meet the demand for aircrafts capable of having the same manoeuvrability and ease of use of the helicopter and, at the same time, overcome the intrinsic limits indicated above, convertiplanes are known.

In greater detail, known types of convertiplanes basically comprise:
- a fuselage extending along a first longitudinal axis;
- a pair of cantilever wings projecting from opposite sides of the fuselage and having respective free ends opposite to the fuselage and aligned along a second transversal axis substantially orthogonal to the first longitudinal axis;
- a pair of nacelles carrying respective engines and fixed with respect to the associated wings; and
- a pair of rotors rotatable about respective third axes and operatively connected to the respective engines.

In this embodiment solution, for example in the BELL V-280 aircraft, the rotors are tiltable with respect to the associated engines and nacelles and the associated wing about a related fourth axis parallel to the second axis.

Convertiplanes are also able to selectively assume:
- an "aeroplane" configuration, in which the rotors are arranged with the respective third axes substantially parallel to the first axis of the convertiplane; or
- a "helicopter" configuration, in which the rotors are arranged with the respective third axes substantially vertical and transversal to the first axis of the convertiplane.

Due to the possibility of tilting the rotors, convertiplanes are able to take off and land like a helicopter, i.e. in a direction substantially perpendicular to the first longitudinal axis of the convertiplane, without the need of a runway.

Furthermore, convertiplanes are also able to take off and land on rough terrain and without generating noise levels incompatible with urban areas.

In addition, convertiplanes are capable of hovering when arranged in the helicopter configuration.

Convertiplanes can also reach and maintain cruising speeds of approximately 250-300 knots and flight altitudes in the order of 30,000 feet when arranged in the aeroplane configuration.

This cruising speed is much higher than the roughly 150 knots defining the maximum cruising speed for helicopters.

Similarly, the aforementioned altitude is much higher than that typical of helicopters and enables convertiplanes arranged in the aeroplane configuration to avoid the clouds and atmospheric disturbances characteristic of lower altitudes.

In a known manner, the wings of the aircraft each comprise a wing box connected to the fuselage in a fixed manner and movable appendages.

These movable appendages are hinged to the main body so as to define respective trailing edges of the corresponding wings.

Ailerons and flaps constitute examples of these movable appendages.

Ailerons are adapted to control the aircraft's roll, i.e. the inclination of the aircraft about a longitudinal axis of the fuselage.

To that end, ailerons are tilted in mutually opposite directions with respect to the fuselage, so as to increase the lift of one wing and reduce the lift of the other wing.

Instead, flaps are both tilted in the same direction, so as to increase or reduce the overall lift generated by the wings.

In order to reduce overall dimensions, it is also known to combine the aileron and the flap in a single movable appendage, known in the aviation industry as a flaperon.

Flaperons act like flaps, i.e. reduce or increase the lift generated by the wings, in the aircraft's take-off or landing phase.

Flaperons act like ailerons, i.e. reduce the lift of one wing and increase the lift of the other wing, when it is necessary for the aircraft to perform a roll manoeuvre.

In order to improve the aerodynamic efficiency of the wings when the convertiplane is in the aeroplane configuration, it is necessary to reduce as far as possible any interruption in the airflow at the interface between the wings and the respective movable appendages.

In other words, it is necessary to ensure that the airstream flows in the least disturbed manner at the interface between the wings and the respective movable appendages.

More specifically, each aperture between the trailing edge of the wings and the movable appendages causes a substantial increase in the overall resistance generated by the aircraft's wings, with negative consequences on the aircraft's payload and performance.

In order to reduce these negative effects, U.S. Pat. No. 5,094,412 describes a convertiplane equipped with flaperons. Each flaperon comprises an associated leading edge hinged to a trailing edge of the associated wing.

For each wing, this convertiplane also comprises a sealing element interposed between the respective wing and the corresponding flaperon, which is adapted to close the aperture between them when the corresponding flaperon is operated.

In particular, the convertiplane comprises a connecting structure for each wing configured so as to arrange the associated sealing element in a closing position of the aforementioned aperture, for predetermined angular positions of the flaperon when the flaperon is operated.

Each wing also comprises an end spar arranged at the side of an associated trailing edge and having a flat section in a plane orthogonal to the wing's direction of extension.

The above-described solutions allow room for improvement.

In particular, the sealing elements define additional elements, which require specific space occupation and dedicated connection structures.

There is awareness in the industry of the need to optimize the aerodynamic behaviour of the interface between each wing box and the associated movable appendage for different tilt angles of the movable appendages, whilst limiting, as far as possible, the bulk of the wing and simplifying manufacture.

There is also awareness in the industry of the need for arranged movable appendages that, in addition to enabling control of the convertiplane in the "aeroplane" configuration, interfere as little as possible with the downwash generated by the action of the rotors when the convertiplane is in the "helicopter" configuration.

This need is exacerbated in the previously mentioned implementation solution, where the nacelles are fixed with respect to the wings and the rotors are tiltable with respect to the associated nacelles.

In fact, in this solution, the surface of the nacelles exposed to the rotors' downwash is particularly significant, therefore penalizing the efficiency of the rotors in the "helicopter" configuration and resulting in the need for larger rotors, with evident problems of overall bulk.

XP055391132 discloses a tilt-rotor demonstrator.

US-A-2017/305565 discloses a propulsion system for a tiltrotor aircraft with an engine supported by the airframe and a fixed gearbox operably coupled to the engine. Inboard and outboard pedestals are supported by the airframe and positioned above the wing. A pylon assembly is rotatably coupled between the inboard and outboard pedestals. The pylon assembly includes a spindle gearbox having an input gear, a mast operably coupled to the input gear and a proprotor assembly operable to rotate with the mast. The spindle gearbox is rotatable about a conversion axis to selectively operate the tiltrotor aircraft between helicopter and airplane modes. A common shaft, rotatable about the conversion axis, is configured to transfer torque from an output gear of the fixed gearbox to the input gear of the spindle gearbox. Each of the inboard and outboard pedestals includes a journal bearing that provides a stiff coupling with the pylon assembly.

US-A-2018/305037 discloses a fuel system for an aircraft. The fuel system includes fuel cell having a plurality of sides including a first side and at least one deformable clip having a secured end and a free end. The secured end is coupled to the first side of the fuel cell and the free end overlapping the airframe of the aircraft such that the first side of the fuel cell is positioned adjacent to the airframe. The at least one deformable clip is deformable to allow the fuel cell to move independently of the airframe in response to an impact of the aircraft, thereby protecting the fuel cell from damage resulting from the impact.

FR-A-2791634 discloses a tilt wing aircraft. The aircraft has a nacelle with a front section which tilts with the rotor and a fixed rear section receiving the engine. The front tilting section has a lower cowling, which is extended at the rear, in the aircraft mode, by a re-curved cap. The cap provides a smooth flow surface when the engine is in helicopter mode.

DISCLOSURE OF INVENTION

The object of the present invention is the embodiment of a convertiplane that enables satisfying at least one of the above-specified needs in a simple and inexpensive manner. Moreover, a method of controlling a convertiplane is described herein.

BRIEF DESCRIPTION OF THE DRAWINGS

For a better understanding of the present invention, a non-limitative preferred embodiment is described hereinafter, purely by way of example and with the aid of the accompanying drawings, in which.

BEST MODE FOR CARRYING OUT THE INVENTION

Figure 1:
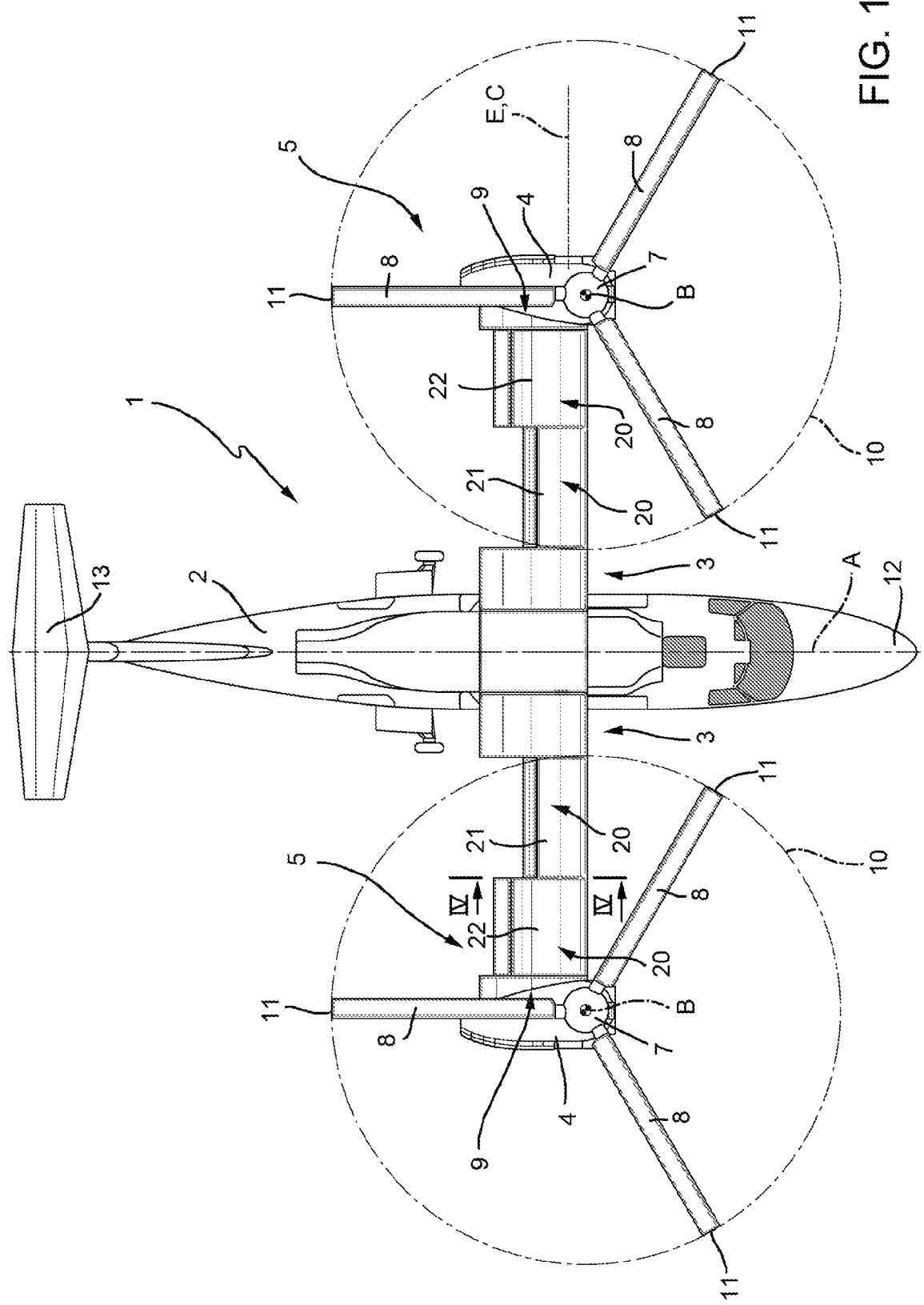
FIG. 1 is a top view of a convertiplane made according to the teachings of the present invention, in a "helicopter" configuration and comprising a pair of wings made according to the principles of a first embodiment.

Referring to FIGS. 1 to 8, reference numeral 1 indicates an aircraft, in particular a convertiplane.

The convertiplane 1 basically comprises:
- a fuselage 2 having an axis A of longitudinal extension;
- a pair of cantilever wings 3 extending from respective mutually opposite sides of the fuselage 2 and transversely to axis A;
- a pair of nacelles 4 housing respective engines, not shown, and fixed with respect to the corresponding wings 3; and
- a pair of rotors 5 operatively connected to the respective engines.

The fuselage 2 also comprises a nose 12 arranged at the front and a tail portion 13, opposite to each other along axis A.

The free edges 9 of the respective wings 3 opposite to the fuselage 2 are aligned along an axis E orthogonal to axis A.

It should be noted that the terms "at the front", "tail", "longitudinal", "side", "above", "below" and the like used in this description refer to the normal direction of forward flight of the convertiplane 1 shown in FIGS. 1 to 3.

In greater detail, each rotor 5 basically comprises:
a drive shaft rotatable about an axis B;
a hub 7 driven in rotation by the drive shaft; and
a plurality of blades 8 hinged on the hub 7.

The rotors 5 are tiltable about an axis C with respect to the associated wings 3 and the associated nacelles 4.

Axis C is transversal to axis A and axes B.
Axis C is also parallel to axis E.
The convertiplane 1 can be selectively arranged:
in a "helicopter" configuration (shown in FIG. 1), in which the axes B of the rotors 5 are orthogonal to axis A and axis C; and
in an "aeroplane" configuration (shown in FIG. 2), in which the axes B of the rotors 5 are parallel to axis A and orthogonal to axis C.

Since the rotors 5 are identical, reference will be made hereinafter to an individual rotor 5.

The blades 8 extend along respective axes and comprise respective free tips 11.

During rotation, the free tips 11 of the blades 8 of the rotor 5 trace an imaginary circumference indicated hereinafter in this description as the rotor disc 10.

Since the wings 3 are identical, reference will be made hereinafter to an individual wing 3 of the convertiplane 1 for brevity of description.

In greater detail, the wing 3 comprises:
a wing box 20; and
a pair of movable appendages 21 and 22 independently hinged to the wing box 20, in particular, hinged on the wing box 20 about axis E.

Furthermore, the rotor 5 is arranged at the edge 9 of the wing 3.

In particular, the movable appendages 21 and 22 are arranged one after the other along the axis E, proceeding from the fuselage 2 towards the rotor 5.

With particular reference to the "helicopter" configuration shown in FIG. 1, the movable appendages 21 and 22 are arranged below the rotor 5.

In other words, the movable appendages 21 and 22 are arranged inside the ideal cylinder obtained by extending the rotor disc 10 parallel to axis B.

More specifically, movable appendage 21 is arranged below the rotor disc 10, i.e. in the area where the blades 8 have the maximum tangential speed and where the effect of the downwash generated by the rotor 5 is greater.

The wing box 20 comprises (FIG. 7):
a plurality of ribs 25a and 25b lying on respective planes orthogonal to axis E and extending parallel to axis A;
a plurality of spars 26a, 26b and 26c extending parallel to axis E, orthogonal to the ribs 25a and 25b and spaced from each other along the axis A; and
a covering 27 adapted to give the wing box 20 the shape of a wing profile 28 of the desired aerodynamic form.

In turn, the covering 27 defines:
a leading edge 29 facing towards the nose 12 and extending parallel to axis E;
a trailing edge 30 facing towards the tail portion 13, extending parallel to axis E and opposite to leading edge 29 with respect to axis A;
an aerodynamically shaped first surface, defined hereinafter as the top surface 31, extending between the leading edge 29 and the trailing edge 30; and
an aerodynamically shaped second surface, defined hereinafter as the bottom surface 32, extending between the leading edge 29 and the trailing edge 30 on the side opposite to the top surface 31.

Proceeding from the trailing edge 30 to the leading edge 29, the spars 26a, 26b and 26c are arranged in sequence.

The appendages 21 and 22 are arranged on the side of the trailing edge 30 of the wing box 20.

Each appendage 21, 22 defines a respective wing profile 35, 36 and, in turn, comprises:
a respective end wall 41 or 42 hinged to the wing box 20;
a respective trailing edge 43 or 44 opposite to wall 41 or 42;
a respective aerodynamically shaped surface, defined hereinafter as top surface 45 or 46, which extends between the respective wall 41 or 42 and the associated trailing edge 43 or 44; and
a respective aerodynamically shaped surface, defined hereinafter as bottom surface 47 or 48, which extends between the respective wall 41 or 42 and the associated trailing edge 43 or 44 on the side opposite to the corresponding top surface 45 or 46.

Appendage 22 is hinged to the wing box 20 parallel to axis E.

When the convertiplane 1 is in the "aeroplane" configuration (FIG. 2), appendage 22 is controlled like a flaperon.

Figure 2:
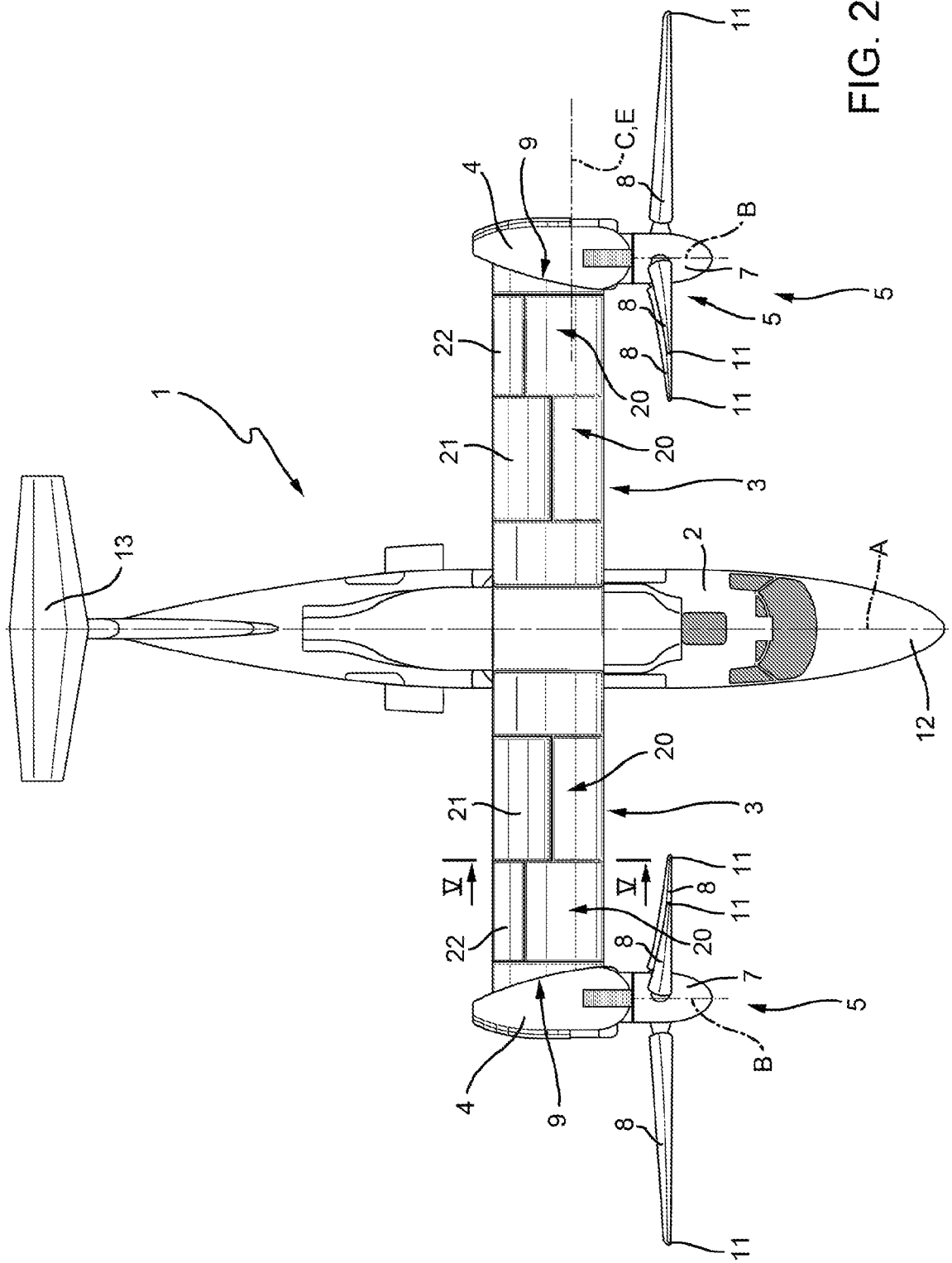
FIG. 2 is a top view of the convertiplane in FIG. 1 in an "aeroplane" configuration.
Figure 3:
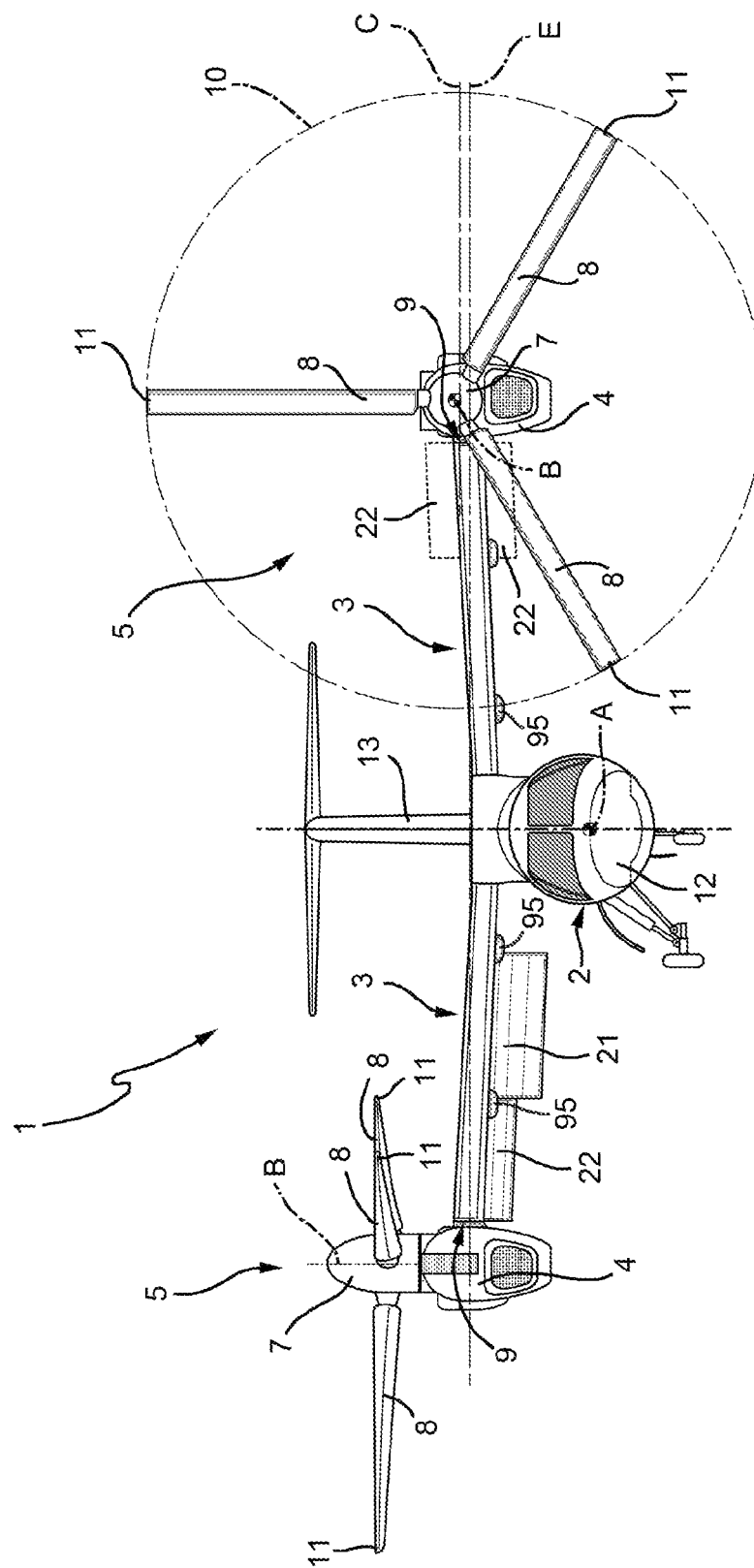
FIG. 3 is a front view of the convertiplane of FIGS. 1 and 2, showing the left wing in the "helicopter" configuration and the right wing in the "aeroplane" configuration.

More specifically, appendage 22 is normally arranged in a neutral position, shown in FIG. 2, where the top surface 46 and bottom surface 48 define respective extensions of the top surface 31 and bottom surface 32 of the wing box 20.

Furthermore, appendage 22 is selectively movable from the neutral position to a first raised operating position and a second lowered operating position.

In particular, by setting one of appendages 22 in the first raised position and the other appendage 22 in the second lowered operating position, it is possible to generate a roll moment about axis A on the aircraft 1.

Contrariwise, by setting both appendages 22 in the respective first raised operating positions or second lowered operating positions, the overall lift generated by the wings 3 is respectively reduced or increased.

Preferably, appendages 22 can be selectively arranged in respective third operating positions, interposed between the respective neutral positions and first raised operating positions, when the convertiplane 1 exceeds a certain cruising speed, so as to define air brakes.

In the case shown, the angle between the neutral position and the first raised operating position is 30 degrees. The angle between the neutral position and the second lowered operating position is 30 degrees. The angle between the neutral position and the third raised operating position is approximately 5 degrees.

When the convertiplane 1 is in the "helicopter" configuration (FIG. 1), appendage 22 is arranged in a fourth lowered position.

Preferably, the angle α of movement of appendage 22 between the fourth lowered position and the neutral position is variable according to the forward speed on the convertiplane 1 in "helicopter" mode.

The maximum angle α of the aforementioned movement is greater than the angle defined by appendage 22 between the second lowered operating position and the neutral position and, in the case shown, is equal to 70 degrees.

The movement of appendage 22 from the neutral position to the fourth lowered position takes place following the transition of the convertiplane 1 from the "aeroplane" configuration to the "helicopter" configuration and vice versa.

Alternatively, this movement takes place when the forward speed of the convertiplane 1 drops below a threshold value.

Advantageously, appendage 21 is hinged to the wing box 20 and is selectively movable between:
- a first neutral position (FIG. 5), assumed when the convertiplane 1 is in the "aeroplane" configuration, and in which it defines an extension of the wing box 20; and
- a second lowered operating position (FIG. 4), assumed when the convertiplane 1 is in the "helicopter" configuration, and in which it defines, with the wing box 20, an opening 50 through which the downwash generated by the rotor 5 can pass.

In the first neutral position (FIG. 5), the wing profiles 35 and 28 are contiguous with one another, and the portion of top surface 45 and bottom surface 47 adjacent to the trailing edge 43 define respective extensions of the top surface 31 and of the bottom surface 32 of the wing box 20.

In the second lowered operating position (FIG. 4), the wing profiles 35 and 28 are separated from one another, and top surface 45 and bottom surface 47 are respectively separated from the top surface 31 and from the bottom surface 32 of the wing box 20.

The spar 26a is curved in a plane orthogonal to axis E and wall 41 of appendage 21 is arranged abutting its entire length against spar 26a when appendage 21 is in the first neutral position.

Figure 4:
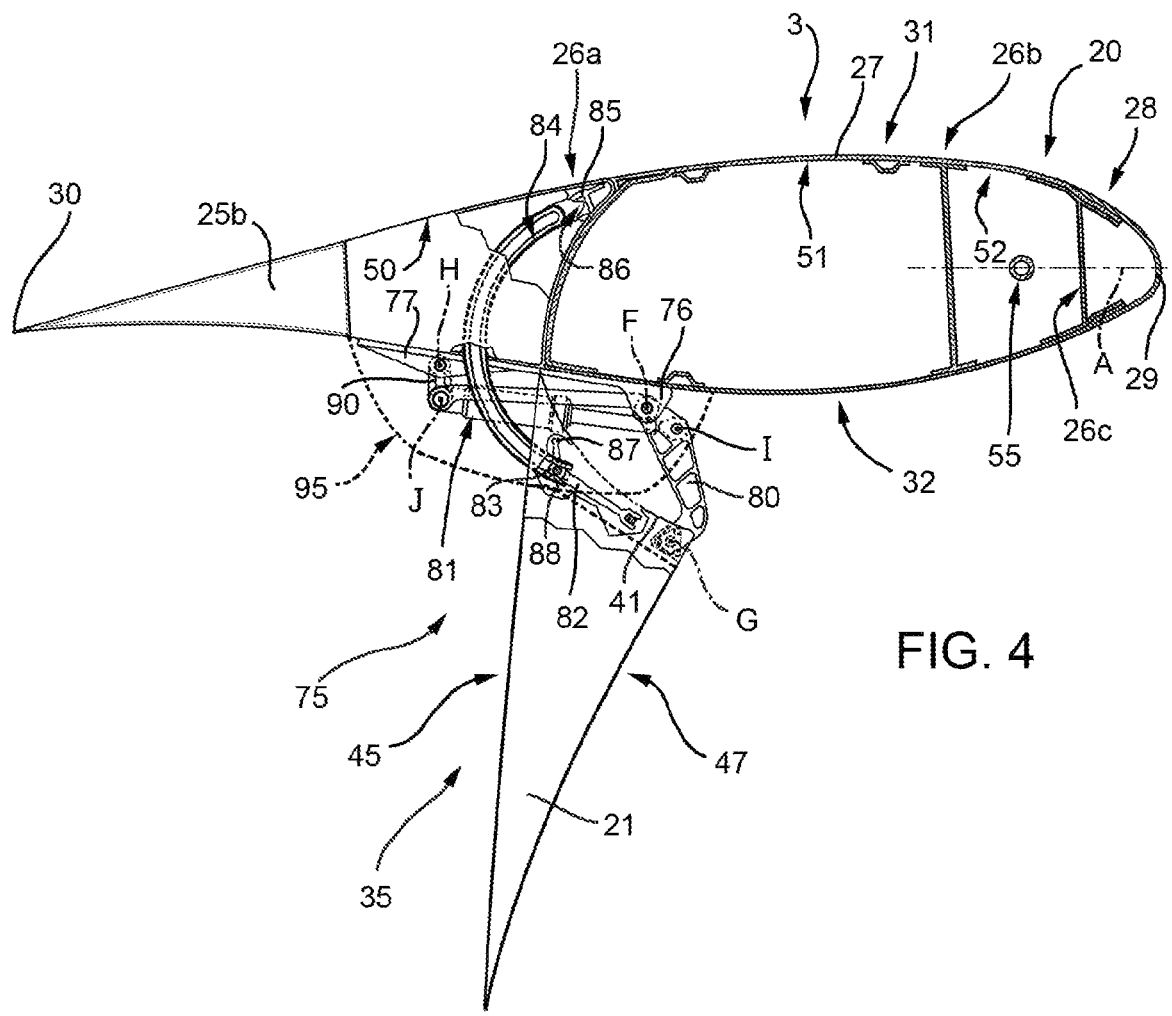
FIG. 4 is a section along the line IV-IV of FIG. 1 of the wing of FIGS. 1 to 3 in a first operating configuration.

The top surface 45 of appendage 21 defines an extension of spar 26a when appendage 21 is in the second lowered operating position (FIG. 4).

The opening 50 is open on the side opposite to the leading edge 29 and delimited by two mutually consecutive ribs 25b and a section 53 of spar 26a extending between the ribs 25b.

The trailing edge 30 of the wing box 20 is interrupted at this opening 50.

Figure 5:
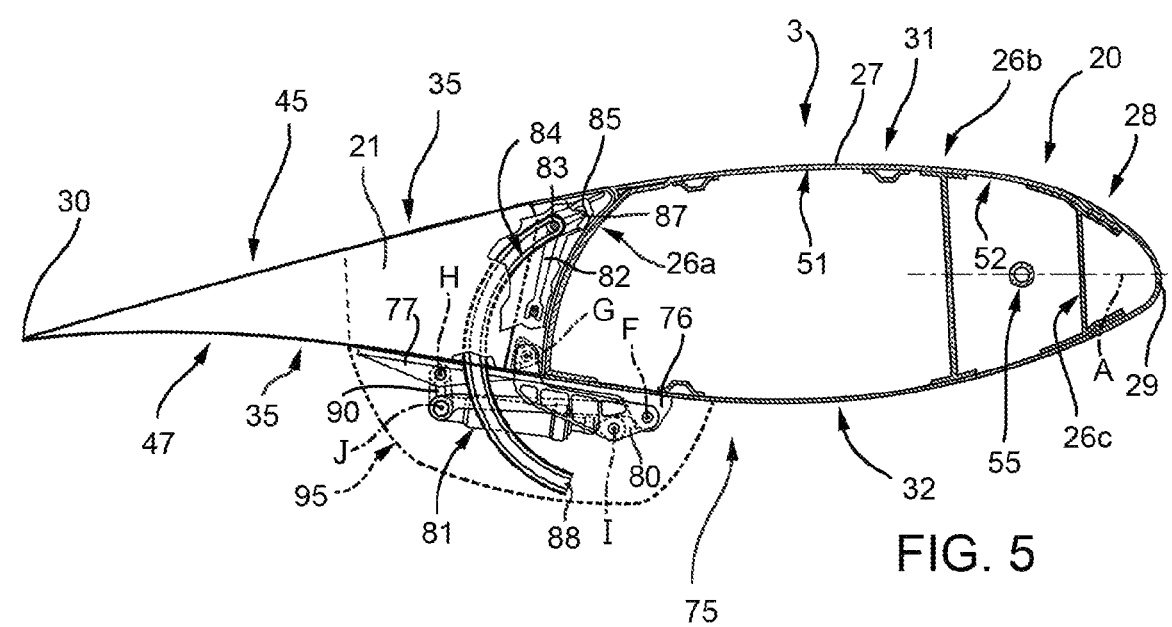
FIG. 5 is a section along the line V-V of FIG. 2 of the wing of FIGS. 1 to 4 in a second operating configuration.
Figure 6:
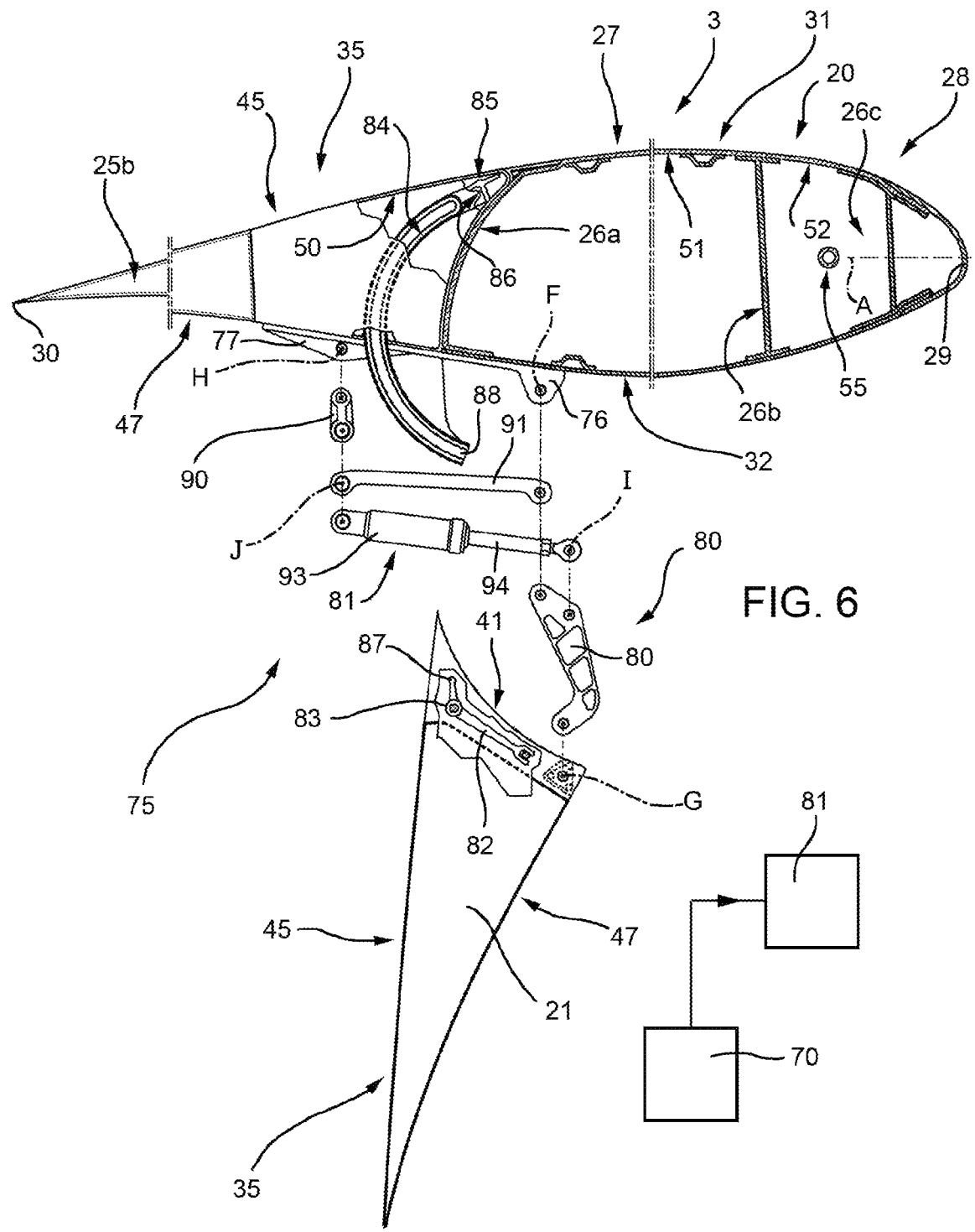
FIG. 6 is an exploded side view of the wing of FIGS. 1 to 5 in the second operating configuration.
Figure 7:
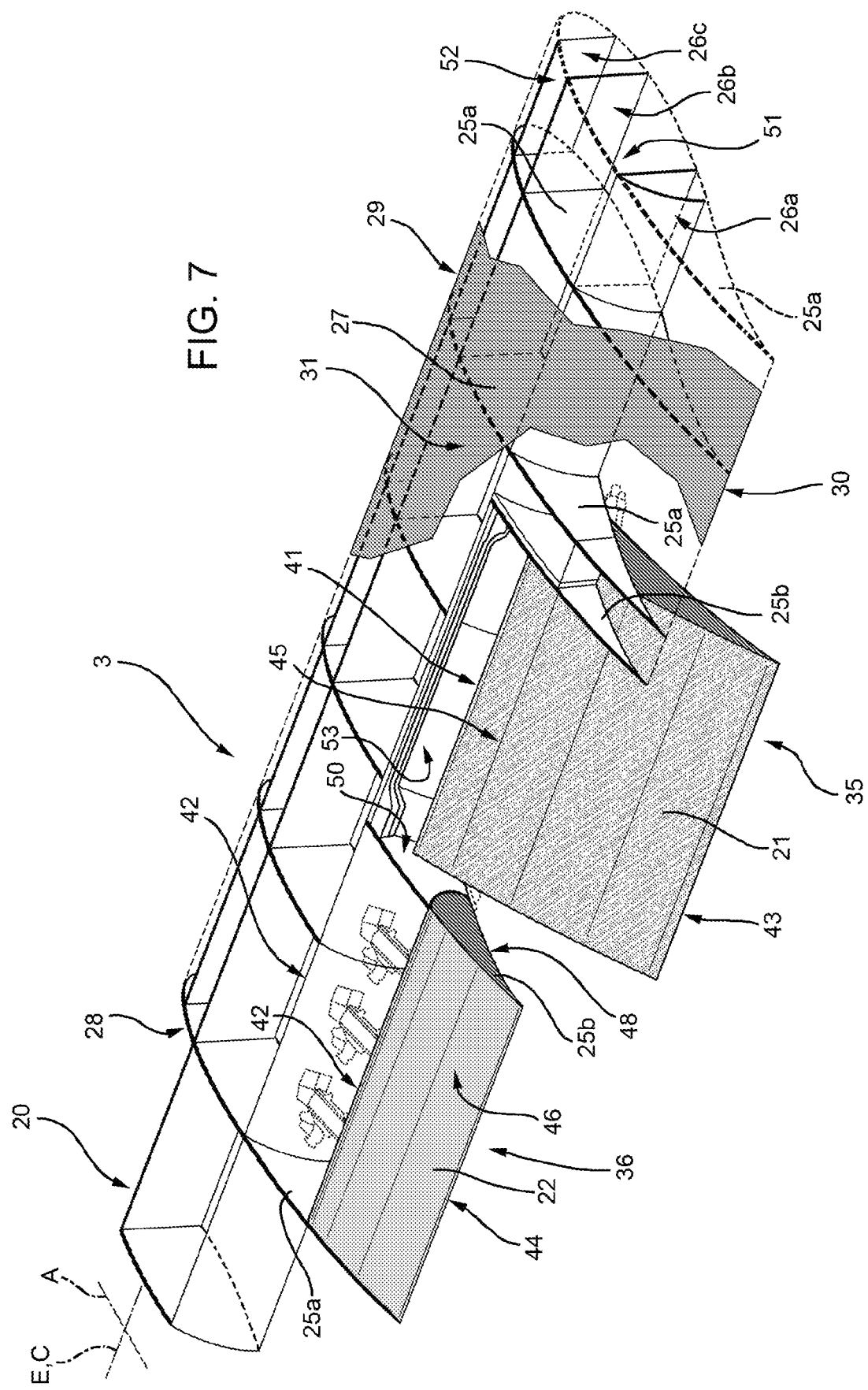
FIG. 7 is a perspective view of the wing of FIGS. 1 to 6, with parts removed for clarity.

Appendage 21 is at least partly housed inside the opening 50 when it is arranged in the first neutral position (FIG. 5).

More specifically, wall 41 and the portions of top surface 45 and bottom surface 47 adjacent to wall 41 are housed inside the opening 50 when appendage 21 is arranged in the first neutral position.

Wall 41 also has a curvature facing trailing edge 43, proceeding from top surface 45 towards the bottom surface 47 in a section obtained in a plane orthogonal to axis E.

When appendage 21 is arranged in the first neutral position, the airflow flowing along the wing box 20 and appendage 21 does not effectively undergo any interruption, optimizing the behaviour of the wing 3 when the convertiplane 1 is in the aeroplane configuration.

Contrariwise, when appendage 21 is arranged in the second lowered operating position, the downwash generated by the rotor 5 flows along spar 26a and through the opening 50. Consequently, the appendage 21 interferes in a substantially limited manner with the downwash generated by the rotor 5, optimizing the behaviour of the wing 3 when the convertiplane 1 is in the "helicopter" configuration.

Referring to the "aeroplane" configuration of the convertiplane 1, the trailing edge of the wing 3 is defined by the trailing edge 30 of the wing box 20 and by the trailing edge 44 of appendage 22 between ribs 25a and 25b, and by the trailing edge 43 of appendage 21 between ribs 25b.

Furthermore, wing box 20 defines:
- a compartment 51 delimited by spars 26a and 26b and the portions of top surface 31 and bottom surface 32 between these spars 26a and 26b; and
- a compartment 52 delimited by spar 26b and 26c and the portions of top surface 31 and bottom surface 32 range between these spars 26b and 26c.

Compartment 51 defines a portion of a fuel tank.

Compartment 52 houses an interconnection shaft 55, which connects the rotors 5 to each other.

In particular, spar 26a has a C-shaped section and spars 26b and 26c have an I-shaped section in a plane orthogonal to axis E.

Furthermore, spar 26a has a curvature facing the trailing edge 30 in a plane orthogonal to axis E, proceeding from the top surface 31 to the bottom surface 32 of the wing box 20.

The convertiplane 1 further comprises:
- a control unit 70 (only schematically shown in FIG. 6);
- a plurality, three in the case shown, of actuating mechanisms (not described in detail as they do not form part of the present invention) functionally connected to the control unit 70 for moving appendage 22 between the respective neutral and operating positions; and
- a pair of actuating mechanisms 75 (FIGS. 4 to 6 and 8) functionally connected to the control unit 70 for moving appendage 21 between the respective first neutral positions and the second operating positions.

Figure 8:
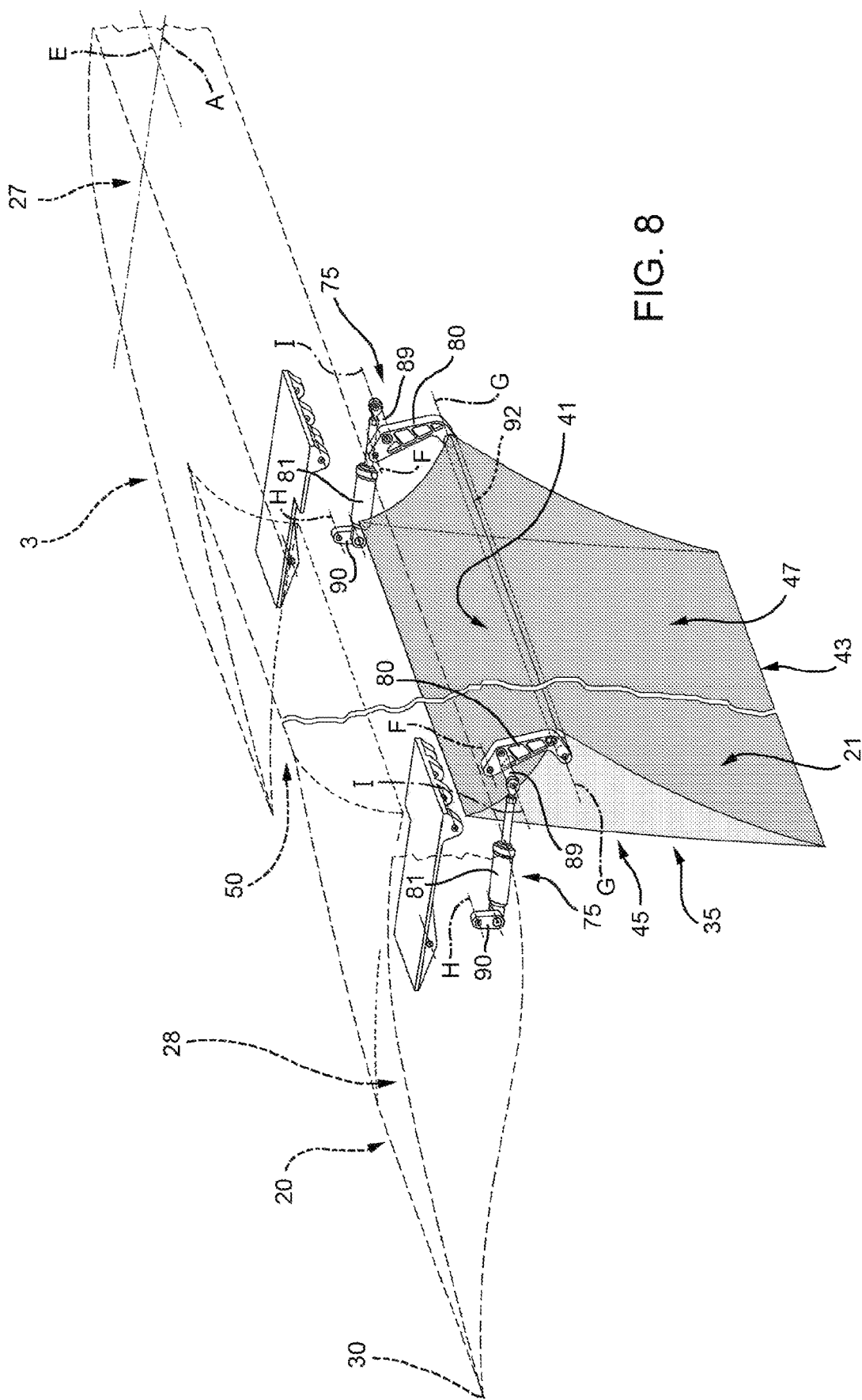
FIG. 8 is a further perspective view of the wing of FIGS. 1 to 7 from a different viewing angle, with parts removed for clarity.

In greater detail, the actuating mechanisms 75 are arranged on respective mutually opposite side edges of appendage 21, as shown in FIG. 8.

Each actuating mechanism 75 comprises:
- a lever 80 hinged to the wing box 20 about an axis F defined by the bottom surface 32 in a position interposed between spars 26a and 26b and hinged to wall 41 of appendage 21 about an axis G; and
- a variable-length telescopic actuator 81 controlled by the control unit 70, hinged with respect to an axis H arranged on the bottom surface 32 of the wing box 20 in a position interposed between spar 26a and the trailing edge 30, and hinged to the lever 80 about an axis I in an intermediate position between axes F and G.

In particular, the actuator 81 comprises a sleeve 93 and a piston 94, sliding with respect to the sleeve 93.

In the case shown, axes F, G, H and I are parallel to one another and parallel to axis E.

In addition, the axes H and F of each actuating mechanism 75 are arranged on respective brackets 77 and 76 fixed to the respective rib 25b.

Each actuating mechanism 75 further comprises:
- an arm 82 carried by appendage 21 and fitted with a roller 83; and
- a slot 84 having a C-shaped section in a plane orthogonal to axis E and defined by the wing box 20 in a position interposed between spar 26a and the trailing edge 30.

The roller 83 slides inside the slot 84 following the movement of appendage 21 from the second lowered position to the first neutral position.

The wing box 20 further comprises a pair of stop elements 85 defining respective seats 86 engaged by corresponding projections 87 carried by respective arms 82, when appendage 21 is in the first position.

In particular, each projection 87 extends from the roller 83 in a direction transversal to the associated arm 82.

Each actuating mechanism 75 further comprises:
- a connecting rod 90 hinged to the wing box 20 about axis H and to which the respective actuator 81 is hinged about an axis J; and a pair of rods 91 hinged to the associated connecting rod 90 about the associated axis I, and to the wing box 20 and to the lever 80 about axis F.

Axes J are parallel to respective axes F, G, H and I.

The levers 80 of the actuating mechanisms 75 are connected to each other by a rod 92 (shown in FIG. 8), so as to ensure the correct movement of appendage 21 in the event of one of the actuating mechanisms 75 failing.

As shown in FIG. 8, the actuator 81 and the lever 80 of each actuating mechanism 75 lie on respective planes orthogonal to axis E, parallel to and spaced apart from each other.

The hinge between the actuator 81 and the lever 80 about axis I of each actuating mechanism 75 is obtained via an associated pin 89 (FIG. 8) extending along the corresponding axis I and connected to the respective actuator 81 and lever 80.

The slot 84 of each actuating mechanism 75 is interposed between the corresponding actuator 81 and lever 80 along the corresponding axis E.

The slot 84 of each actuating mechanism 75 is open on the side of the associated arm 82 and is defined by the associated rib 25b.

Each slot 84 extends from the associated seat 86 defined by the top surface 31 of the wing box 20 up to a free end 88 arranged below the bottom surface 32 of the wing box 20.

More specifically, each slot 84 has a curvature facing the trailing edge 30 in a plane orthogonal to axis E, proceeding from the associated seat 86 to the associated end 88.

The actuator 81 of each actuating mechanism 75 is interposed between the respective rods 91 along the corresponding axis E.

When appendage 21 is in the neutral position (FIG. 5), the actuator 81, lever 80, rods 91 and axis G of each actuating mechanism 75 are contained within the space occupied by the associated slot 84 in a plane orthogonal to axis E.

Preferably, the axes of extension of the actuator 81, lever 80 and rods 91 of each actuating mechanism 75 are substantially parallel to one another.

Contrariwise, when appendages 21 are arranged in the respective second lowered operating positions (FIG. 4), axes G are arranged below, in a plane orthogonal to axis E, at the free ends 88 opposite to the stop elements 85 of the respective slots 84.

In this condition axes G and arms 82 are preferably arranged below ends 88 in a plane orthogonal to axis E.

The wing 3 also comprises a fairing 95 (only schematically shown in FIGS. 4 and 5) housing the actuating mechanism 75 when appendage 21 is in the first neutral position, to limit its effect on the aerodynamics of the convertiplane 1.

This fairing 95 is opportunely configured to allow the lowering of appendage 21 and the movement of the actuating mechanisms 75, when appendage 21 moves between the first neutral position and the second lowered operating position.

In an embodiment that is not shown, appendages 21 can be selectively arranged in respective third raised operating positions (not shown) when the convertiplane 1 is in the aeroplane configuration, so as to define air brakes.

Each first neutral position of appendages 21 is angularly interposed between the respective second lowered operating position and the respective third raised operating position.

The functioning of the convertiplane 1 is described below in detail, starting from the "aeroplane" configuration of the convertiplane 1 shown in FIG. 1 (FIG. 2) and with reference to a single wing 3.

In this condition, axis B of the rotor 5 is parallel to axis A and orthogonal to axis C.

In this "aeroplane" configuration, appendage 21 is arranged in the first neutral position and appendage 22 is controlled like a flaperon.

In this first neutral position, wall 41 of appendage 21 abuts against spar 26a, and the frontal portion of appendage 21 engages in the opening 50.

In other words, appendage 21 defines an extension of the wing box 20. Moreover, the actuating mechanism 75 is housed inside the fairing 95.

Consequently, the airflow flowing along the wing box 20 and appendage 21 does not effectively undergo any interruption, optimizing the behaviour of the wing 3 when the convertiplane 1 is in the aeroplane configuration.

In greater detail, appendage 22 is normally arranged in the neutral position, shown in FIG. 2, and is selectively movable to the first raised operating position or the second lowered operating position.

In particular, if it necessary to respectively lower or increase the lift generated by the wings 3, both appendages 22 are arranged in the respective first raised operating positions or second lowered operating positions. In these conditions, appendages 22 act like flaps. Contrariwise, if it is necessary to generate a roll moment directed about axis A on the convertiplane 1, one of appendages 22 is arranged in the first raised position and the other appendage 22 is arranged in the second lowered position. In these conditions, appendages 22 behave like traditional ailerons.

In special flight operating conditions, appendages 21 and 22 are selectively arranged in the respective third raised operating positions, where they define air brakes.

In the case where it is necessary to operate the convertiplane 1 in the "helicopter" configuration, the rotors 5 are turned 90 degrees towards the tail portion 13 of the fuselage 2 about axis C. At the end of this rotation, axes B are orthogonal to axis A and axis C (FIG. 1).

In this condition, the downwash generated by the rotor 5 strikes the portion of the wing 3 defining appendages 21 and 22. This downwash generates the lift necessary to allow the convertiplane 1 to lift off in flight in the "helicopter" configuration.

In addition, the opening 50 of the wing box 20 is arranged below the rotor disc 10, i.e. in the area where this downwash generated by the rotor 5 is more intense.

In this "helicopter" configuration, appendage 21 is arranged in the second lowered operating position and appendage 22 is arranged in the fourth lowered position.

As appendage 21 is arranged in the respective second lowered operating position (FIG. 4), the downwash generated by the rotor 5 flows through the opening 50 freed by appendage 21. Furthermore, this airflow flows substantially undisturbed along spar 26a and the top surface 45 of appendage 21, which effectively defines an extension.

This airflow also flows through the opening delimited by the wing 3 and left free by appendage 22 arranged in the fourth lowered position.

The control unit 70 moves appendage 21 between the first neutral position and the second lowered operating position via actuating mechanism 75. Similarly, the control unit 70 moves appendage 22 between the neutral position, the first raised operating position, the second lowered operating position, the third raised position and the fourth lowered position, via an actuating mechanism not shown and not forming part of the present invention.

More specifically, if the pilot or an automatic pilot system, not shown, activates the transformation of the convertiplane 1 from the "aeroplane" configuration to the "helicopter" configuration, the control unit 70 moves appendage 21 from the first neutral position (FIG. 5) to the second lowered operating position (FIG. 4) and appendage 22 to the fourth lowered operating position.

In greater detail, in the first neutral position of appendage 21, the projection 87 of each actuating mechanism 75 engages the seat 86 and the lever 80 is arranged substantially parallel to actuator 81 and the connecting rod 90.

Starting from this configuration, shown in FIG. 5, the control unit 70 controls the extension of the piston 94 of each actuator 81 in relation to the respective sleeve 93. This causes the rotation of the levers 80 about axis F in the anticlockwise direction, with reference to FIG. 4, and the consequent rotation of wall 41 and appendage 21 about the movable axis G in the anticlockwise direction.

This causes the rollers 83 to advance in the anticlockwise direction inside the slots 84 until the ends 88 are reached.

In a totally similar manner, in the case where appendage 21 must be moved from the second lowered operating position to the first neutral position, the control unit 70 controls, starting from the condition in FIG. 4, the sliding of the pistons 94 inside the sleeves 93 of the respective actuator 81. This causes the rotation of the levers 80 about axis F in the clockwise direction, with reference to FIG. 4, and the consequent rotation of wall 41 and appendage 21 about the movable axis G in the clockwise direction.

Consequently, the rollers 83 advance in a clockwise direction inside the respective slots 84 until engaging the respective stop elements 85. In this situation, appendage 21 is in the first neutral position, as shown FIG. 5.

Rod 92 ensures the correct movement of the levers 80 in the event of one of the actuators 81 failing.

Furthermore, appendage 21 passes through the gap between the adjacent fairings 95 when set in the second lowered operating position.

Figure 9:
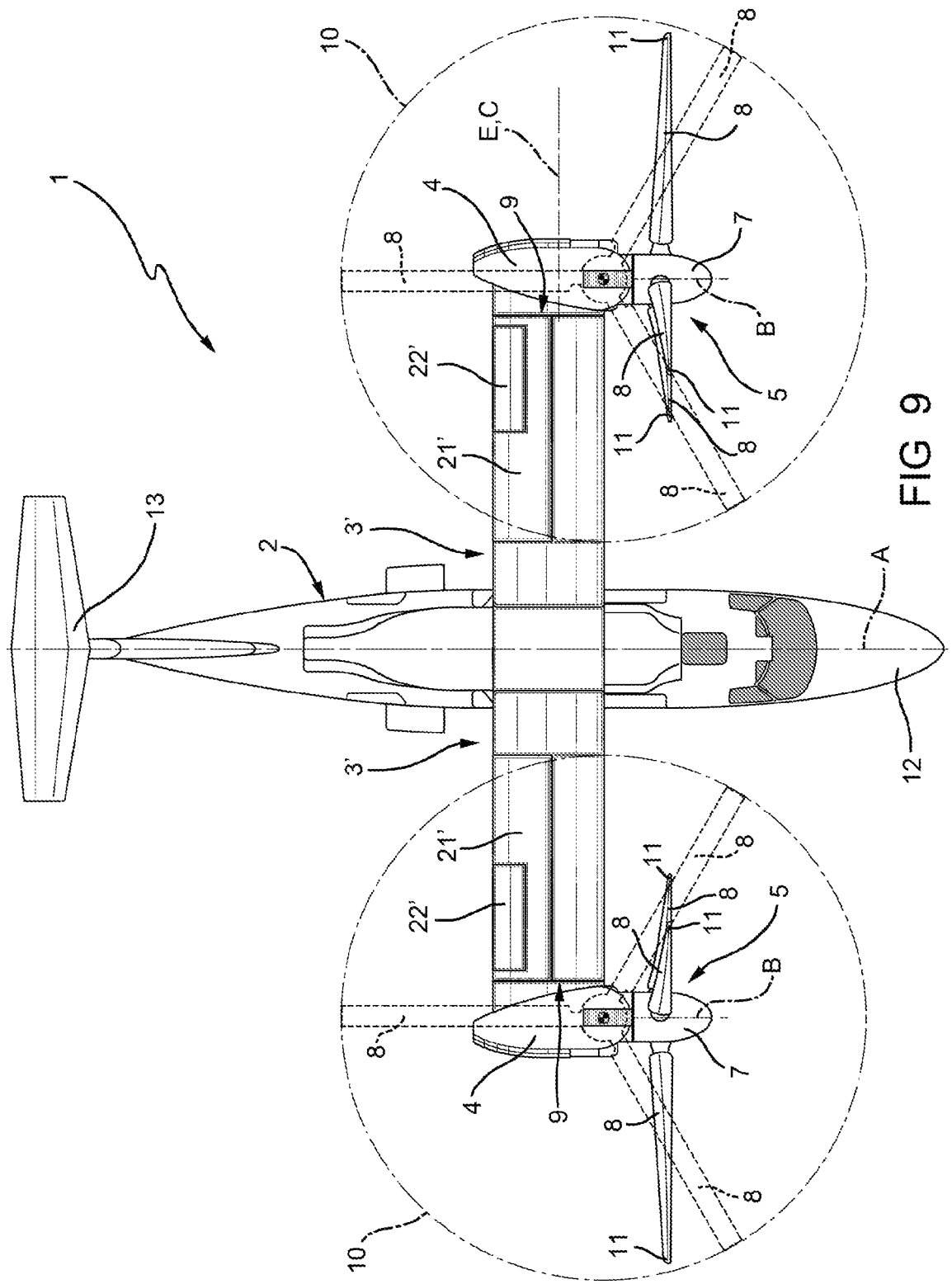
FIG. 9 is a top view of a convertiplane in a "helicopter" configuration and comprising a pair of wings made according to a further embodiment.

Referring to FIG. 9, a convertiplane 1 with a wing 3' according to a further embodiment is shown.

Wing 3' is similar to wing 3 and will be described hereinafter only with regard to the differences; where possible, the same or equivalent parts of wings 3 and 3' will be indicated with the same reference numerals.

In particular, wing 3' differs from wing 3 in that appendage 21' extends up to the nacelle 4 and in that appendage 22' is arranged within appendage 21' in a position close to the nacelle 4.

From an examination of the characteristics of the convertiplane 1 and the control method according to the present invention, the advantages that can be attained therewith are evident.

In particular, appendage 21, 21' is selectively movable between:
the respective first neutral position, assumed when the said convertiplane 1 is in the aeroplane configuration and in which it defines an extension of the wing box 20; and
the respective second lowered operating position, assumed when the convertiplane 1 is in the helicopter configuration and in which it defines, with the wing box 20, the opening 50 through which said airflow generated by said rotor 5 can pass.

Due to this, the airflow that flows over the wing box 20 and appendage 21 arranged in the first neutral position does not effectively undergo any interruption, optimizing the efficiency of the wing 3 and 3' when the convertiplane 1 is in the "aeroplane" configuration.

Unlike the known solutions discussed in the introductory part of this description, this increase in efficiency is achieved without the use of additional sealing elements. Consequently, the overall bulk of the wing 3 and 3' is less and the overall design is particularly simplified.

This increase in efficiency of the wing 3 and 3' is further augmented because appendage 21 is partly housed in the opening 50 defined by the wing box 20. A further increase in efficiency of the wing 3 and 3' derives from the actuating mechanisms 75 being housed inside the fairing 95 when the wing 3 and 3' is in the first neutral position, thereby limiting the resistance of the profile of the wing 3 and 3'.

Moreover, as shown in FIG. 4, the top surface 45 of appendage 21 defines an extension of spar 26a when appendage 21 is in the second lowered operating position and the convertiplane 1 is in the "helicopter" configuration.

In this way, the downwash generated by the rotor 5 flows through the opening 50 and along spar 26a and the top surface 45 of appendage 21, which effectively defines an extension of spar 26a. Thus, appendage 21 interferes in an extremely limited manner with the downwash generated by the rotor 5, optimizing the behaviour of the wing 3 even when the convertiplane 1 is in the "helicopter" configuration.

This effect is particularly accentuated because appendage 21 is positioned below the rotor disc 10 where the downwash from the rotor 5 reaches the maximum levels of intensity.

Furthermore, this effect enables reducing the necessary diameter of the rotor 5 and being able to increase the chord of the wing 3 with respect to known solutions, where the size of the wing 3 along axis A is limited so as not to excessively interfere with this downwash generated by the rotor 5 when the convertiplane 1 is in the "helicopter" configuration.

The above has been found to be particularly advantageous considering that the nacelles 4 of the convertiplane 1 are fixed with respect to the wing 3, and therefore interfere with the aforementioned airflow. In other words, the negative effect of interference with the nacelles 4 is compensated by the positive effect of appendages 21 substantially not interfering with the downwash generated by the rotor 5.

It is clear that modifications and variants can be made to the convertiplane 1 and the method set forth herein without departing from the scope defined in the claims.

In particular, wall 41 could be arranged abutting against spar 26a for a limited part of its length, for example only at the top surface 31 and the bottom surface 32.

The invention claimed is:

1. A convertiplane (1) comprising:
a fuselage (2) extending along a first axis (A);
a pair of cantilever wings (3, 3') projecting from respective sides of said fuselage (2);
a pair of nacelles (4) housing respective engines and fixed with respect to said wings (3, 3'); and
a pair of rotors (5) associated with said wings (3, 3'), rotatable about respective second axes (B) and tiltable about a third axis (C) transversal to said first axis (A) and the respective second axis (B) between:
a first position, wherein said second axes (B) are parallel to said first axis (A), reached when said convertiplane (1) is in an aeroplane configuration; and
a second position, wherein said second axes (B) are orthogonal to said first axis (A) and to said third axis (C), reached when said convertiplane (1) is in a helicopter configuration;
each said wing (3, 3') further comprising a wing box and a first movable appendage (22, 22') hinged to said wing box (20);

each said first appendage (22, 22') being movable with respect to said wing box (20), when said convertiplane (1) is in said aeroplane configuration, between:
  a respective first neutral position with which a first lift value of the respective said wing (3, 3') is associated;
  a respective second raised operating position with which a second lift value of the respective said wing (3, 3'), lower than said first lift value, is associated; and
  a respective third lowered operating position, with which a third lift value of the respective said wing (3, 3'), higher than said first lift value, is associated;
characterized in that each said wing (3, 3') further comprises a second appendage (21, 21') hinged to said wing box (20) and selectively movable between:
  a respective first neutral position, assumed when said convertiplane (1) is in said aeroplane configuration and said convertiplane (1) defines an extension of said wing box (20); and
  a respective second position, assumed when said convertiplane (1) is in said helicopter configuration and said convertiplane (1) defines, with said wing box (20), an opening (50) through which the downwash generated by the respective said rotor (5) can pass;
wherein each said second appendage (21, 21') defines a wing profile (35) comprising an end wall (41) and a first trailing edge (43) opposite to each other;
said wing box (20) of the respective wing (3, 3'), in turn, comprising a first leading edge (29), a spar (26a) having a curved section in a section orthogonal to a fourth axis (E) of extension of the respective wing (3), a first top surface (33) and a first bottom surface (32) opposite to each other and converging to said leading edge (29);
said end wall (41) being curved and arranged to abut against said spar (26a) at least at said first top surface (31) and said first bottom surface (32), when said first movable appendage (22, 22') is in said first position.

2. The convertiplane according to claim 1, wherein the movement of each second appendage (21, 21') from the respective said first position to the respective said second position is caused, in use, by the transition of said convertiplane (1) from aeroplane configuration to said helicopter configuration and vice versa.

3. The convertiplane according to claim 1, wherein each said first appendage (22, 22') is arranged in a respective fourth lowered operating position when said convertiplane (1) is in said helicopter configuration;
  the respective said third lowered operating position being angularly interposed between the respective said first neutral position and the respective said fourth lowered operating position;
  each said first neutral position and the respective said fourth lowered operating position defining a respective first angle (α).

4. The convertiplane according to claim 3, wherein said first angle (α) is selectively variable according to the forward speed of said convertiplane (1).

5. The convertiplane according to claim 3, wherein each said first neutral position of said second appendage (21, 21') and the respective said second position define a relative second angle (β) greater than the maximum value of said first angle (α).

6. The convertiplane according to claim 1, wherein at least a part of each said second appendage (21, 21') extends in a position interposed between said fuselage (2) and said first appendage (22, 22'), proceeding along the respective said wing (3, 3').

7. The convertiplane according to claim 6, wherein said second appendage (21) is arranged entirely in a position interposed between said fuselage (2) and the respective said first appendage (22), proceeding along said respective said wing (3, 3'); or
  wherein said second appendage (21') is interposed between said fuselage (2) and the respective said rotor (5), and in that said first appendage (22') is movable within an opening defined by said second appendage (21').

8. The convertiplane according to claim 1, wherein each said rotor (5) comprises a hub (7) and a plurality of blades (8) hinged on said hub (7); said blades (8) comprising respective tips (11) defining an imaginary rotor disc (10);
  the projection of each said imaginary rotor disc (10) parallel to the respective said second axis (B) on the respective said wing (3, 3') being positioned over said first appendage (22, 22').

9. The convertiplane according to claim 1, wherein said first appendages (22, 22') are selectively movable to respective fifth raised positions angularly interposed between the respective first neutral positions and the respective second raised operating positions when said convertiplane (1) is arranged in said aeroplane configuration, so as to define respective air brakes;
  and/or wherein in that said second appendages (21, 21') are selectively movable to respective third raised positions when said convertiplane (1) is arranged in said aeroplane configuration, so as to define respective air brakes.

10. A convertiplane (1) comprising:
  a fuselage (2) extending along a first axis (A);
  a pair of cantilever wings (3, 3') projecting from respective sides of said fuselage (2);
  a pair of nacelles (4) housing respective engines and fixed with respect to said wings (3, 3'); and
  a pair of rotors (5) associated with said wings (3, 3'), rotatable about respective second axes (B) and tiltable about a third axis (C) transversal to said first axis (A) and the respective second axis (B) between:
    a first position, wherein said second axes (B) are parallel to said first axis (A), reached when said convertiplane (1) is in an aeroplane configuration; and
    a second position, wherein said second axes (B) are orthogonal to said first axis (A) and to said third axis (C), reached when said convertiplane (1) is in a helicopter configuration;
  each said wing (3, 3') further comprising a wing box and a first movable appendage (22, 22') hinged to said wing box (20);
  each said first appendage (22, 22') being movable with respect to said wing box (20), when said convertiplane (1) is in said aeroplane configuration, between:
    a respective first neutral position with which a first lift value of the respective said wing (3, 3') is associated;
    a respective second raised operating position with which a second lift value of the respective said wing (3, 3'), lower than said first lift value, is associated; and
    a respective third lowered operating position, with which a third lift value of the respective said wing (3, 3'), higher than said first lift value, is associated;
  characterized in that each said wing (3, 3') further comprises a second appendage (21, 21') hinged to said wing box (20) and selectively movable between:

a respective first neutral position, assumed when said convertiplane (1) is in said aeroplane configuration and said convertiplane (1) defines an extension of said wing box (20); and a respective second position, assumed when said convertiplane (1) is in said helicopter configuration and said convertiplane (1) defines, with said wing box (20), an opening (50) through which the downwash generated by the respective said rotor (5) can pass;

wherein the movement of each second appendage (21, 21') from the respective said first position to the respective said second position is caused, in use, by the transition of said convertiplane (1) from said aeroplane configuration to said helicopter configuration and vice versa;

wherein each said second appendage (21, 21') defines a wing profile (35) comprising an end wall (41) and a first trailing edge (43) opposite to each other;

wherein each said second appendage (21, 21') comprises a second bottom surface (47) and a second top surface (45) opposite to each other and extending from the respective said wall (41) towards said second trailing edge (43);

said second top surface (45) of said second appendage (21, 21') defining an extension of said first spar (26*a*) when said second appendage (21, 21') is in said second position.

\* \* \* \* \*